(12) United States Patent
Wang et al.

(10) Patent No.: US 11,642,951 B2
(45) Date of Patent: May 9, 2023

(54) MULTI-MODE TORQUE VECTORING ELECTRIC DRIVE AXLE WITH SINGLE ACTUATOR

(71) Applicant: Jilin University, Changchun (CN)

(72) Inventors: Junnian Wang, Changchun (CN); Chunlin Zhang, Changchun (CN); Zhe Liu, Changchun (CN); Changyang Guan, Changchun (CN); Shoulin Gao, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 17/903,379

(22) Filed: Sep. 6, 2022

(65) Prior Publication Data

US 2023/0001777 A1 Jan. 5, 2023

(30) Foreign Application Priority Data

Sep. 6, 2021 (CN) .......................... 202111038368.3

(51) Int. Cl.
*B60K 1/02* (2006.01)
*B60K 17/04* (2006.01)
(Continued)

(52) U.S. Cl.
CPC .............. *B60K 1/02* (2013.01); *B60K 17/046* (2013.01); *B60K 17/165* (2013.01); *F16H 48/36* (2013.01);
(Continued)

(58) Field of Classification Search
CPC ...... B60K 1/02; B60K 17/046; B60K 17/165; B60K 2023/043; B60K 6/445; F16H 48/36; F16H 2048/364; F16H 57/02; F16H 57/023; F16H 57/037; F16H 61/32; F16H 2057/02043; F16H 61/2884

See application file for complete search history.

(56) References Cited

U.S. PATENT DOCUMENTS 8,734,281 B2 * 5/2014 Ai .......................... B60K 6/365
475/5
11,035,451 B1 * 6/2021 Ahn ................ B60W 30/18009
(Continued)

FOREIGN PATENT DOCUMENTS

CN 106965659 A 7/2017
CN 106965662 A 7/2017

*Primary Examiner* — Tinh Dang (57) ABSTRACT

A multi-mode torque vectoring electric drive axle, including a main motor, an auxiliary motor, a differential, a first half shaft, a second half shaft, a primary reducer, a secondary reducer, a planetary gear set, a dual-gear mechanism and a three-phase actuator. The main motor and the auxiliary motor are respectively connected to input ends of the primary reducer and the secondary reducer. Output ends of the primary reducer and the secondary reducer are respectively connected to a differential housing and an input end of the planetary gear set. Two output ends of the planetary gear set are respectively connected to the three-phase actuator and the dual-gear mechanism. An output end of the dual-gear mechanism is connected to the differential housing. The three-phase actuator is a synchronous shifting mechanism for enabling locking, decoupling of the planetary gear set, and connection to the first half shaft.

10 Claims, 7 Drawing Sheets

(51) Int. Cl.
   *B60K 17/16*     (2006.01)
   *F16H 48/36*     (2012.01)
   *B60K 6/445*     (2007.10)
   *B60K 23/04*     (2006.01)

(52) U.S. Cl.
   CPC ........ *B60K 6/445* (2013.01); *B60K 2023/043* (2013.01); *F16H 2048/364* (2013.01)

(56) References Cited

U.S. PATENT DOCUMENTS

| | | | |
|---|---|---|---|
| 2014/0284130 A1* | 9/2014 | Knoblauch | B60K 17/356 180/242 |
| 2020/0262293 A1* | 8/2020 | Glückler | B60K 17/06 |
| 2020/0282827 A1* | 9/2020 | Kaltenbach | B60K 17/06 |

* cited by examiner

---→ Torque flow

MULTI-MODE TORQUE VECTORING ELECTRIC DRIVE AXLE WITH SINGLE ACTUATOR

CROSS-REFERENCE TO RELATED APPLICATIONS

This application claims the benefit of priority from Chinese Patent Application No. 202111038368.3, filed on Sep. 6, 2021. The content of the aforementioned application, including any intervening amendments thereto, is incorporated herein by reference in its entirety.

TECHNICAL FIELD

This application relates to electric vehicle transmission, and more particularly to a multi-mode torque vectoring electric drive axle with a single actuator.

BACKGROUND

Electric vehicles (EVs) featuring zero fuel consumption, high integration, fast dynamic response, and high driving performance have been vigorously developed and widely popularized in recent years. In order to conform to the developing tendency of high performance, diversification, and individuation, the EVs have growing demand for advanced driving technology that can improve the chassis performance, and electric torque vectoring technology is one of the desired technologies.

Torque vectoring (TV) technology can realize the arbitrary transfer of the driving torque generated by the power source between left and right wheels, or between front and rear axles. Specifically, this technology can realize the transfer of the driving torque from the low-speed wheel (or axle) to the high-speed wheel (or axle), and the transfer of the driving torque from the high-speed side to the low-speed side. Therefore, this technology can overcome the defect in the traditional open differentials that "the speeds of two-side wheels can be different, but the torque of them is always equal", so as to improve the control flexibility and steering maneuverability, balance the road adhesion utilization rate of tires, and increase the stability margin of the vehicle, effectively enhancing the handling stability of the vehicle. In addition, this technology can perform the driving torque distribution among four wheels to achieve the goal of energy saving.

Currently, this technology is mainly divided into two categories. One is the torque vectoring control technology applied to distributed-drive-type vehicles represented by in-wheel-motor-drive vehicles, which can achieve the torque vectoring distribution between wheels by directly controlling driving torque of the in-wheel motor of each wheel. However, low power density of the in-wheel motor and increased unsprung mass greatly limit the application of the torque vectoring distribution control technology in automobiles. The other is the torque vectoring differentials (TVDs) (drive axles) applied to centralized driving, which have been applied in some high-end sports cars and high-end sport utility vehicles (SUVs), such as Honda's super handling-all wheel drive (SH-AWD), Mitsubishi's super-all wheel control (SAYC) system and Audi's sport differentials. However, these TVDs are mainly applied on traditional fuel vehicles, and generally use a mechanical torque vectoring distribution mechanism such as multi-disc clutch, resulting in limited torque transfer capacity, reduced mechanical transmission efficiency, low reliability, high cost and complex structure.

In addition, improving the transmission efficiency of electric vehicles and reducing the loss of battery energy are critical to ensure the range of electric vehicles. The traditional single-motor drive axle can only choose high-power motors to meet the power requirements under extreme working conditions, which will cause the phenomenon "a big horse hauls a small carriage", and make the utilization rate of high-efficiency range of the motor low. By comparison, the dual-motor coupling drive technology allows the vehicle to switch to the main motor alone drive when the required driving torque is relatively small, and switch to the dual-motor torque coupling mode when the required driving torque is relatively large, so as to improve the loading rate and the high-efficiency range utilization rate of the driving motor, extending the range.

So far, it has been rarely reported about the application of the dual-motor parallel coupling driving for efficient driving and energy saving, and the torque vectoring drive axle for improving steering maneuverability and handling stability on electric vehicles, only Chinese patent application publication No. 106965659A, titled "Dual-motor coupling drive axle with torque vectoring function", and Chinese patent application publication No. 106965662A, titled "Dual-motor coupling drive axle with torque vectoring function" mention the related technical content. On the basis of achieving the torque vectoring function, these patent references enable transformation of the torque vectoring control motor, which is usually unoperated under straight driving conditions, into an assisted motor capable of participating in the driving by controlling the switching of the four sets of clutches, so as to achieve the dual-motor torque coupling driving, improving the dynamic performance under the working conditions with large torque demand, such as climbing and rapid acceleration. In addition, through the distribution and regulation of the coupled power of the two motors, the respective high-efficiency range can be fully utilized, so as to realize the energy-saving and high-efficiency driving. However, this technical solution requires four sets of clutches, seven planetary gear sets, resulting in complex structure, large axial length and great control difficulty.

In view of the defects existing in the prior art, this application proposes a multi-mode torque vectoring electric drive axle with a single actuator for a centralized-layout electric vehicle, in which one actuator in conjunction with the planetary gear set and dual gear is used to reach the operation under three modes, respectively main motor independent drive mode, dual-motor torque coupling mode and torque vectoring mode. Structurally, the drive axle only has one actuator, which significantly reduces the production cost and control difficulty. Additionally, the dual-motor torque coupling mode makes full use of the high-efficiency advantage of planetary gear set locking, thereby further improving the transmission efficiency of the drive axle. In terms of function, the drive axle can effectively improve the steering stability, trafficability, power performance and economic efficiency of the electric vehicles by switching between different working modes, having a brilliant application prospect.

SUMMARY

An objective of this application is to provide a multi-mode torque vectoring electric drive axle with a single actuator for centralized-drive electric vehicles, which has a compact structure, and can achieve the switching among three working modes: main motor independent-drive mode, dual-motor torque coupling mode and torque vectoring mode. The switching among the three working modes can be performed by controlling the operating state of the single actuator.

Under the main motor independent-drive mode, only the main motor outputs torque, which is mainly used in the conditions where the driving torque demand is relatively small, so as to improve the loading rate of the main motor, and allow the main motor to work in the high-efficiency range, reducing the efficiency loss of the main motor.

Under the dual-motor torque coupling mode, the torque of an auxiliary motor is coupled with the torque output by the main motor to drive the vehicle, improving the dynamics performance of the vehicles. The dual-motor torque coupling mode is mainly used in the working conditions with relatively large torque demand, such as climbing and rapid acceleration. In addition, through the distribution and regulation of the coupled power of the main motor and the auxiliary motor, the respective high-efficiency range the main motor and the auxiliary motor can be fully utilized, so as to realize the energy-saving and high-efficiency driving.

Under the torque vectoring mode, the driving torque output by the multi-mode torque vectoring electric drive axle can be arbitrarily distributed between the half shafts at two sides, which overcomes the defect in the traditional open differentials that "the speeds of two-side wheels can be different, but the torque of them is always equal", effectively enhancing the handling stability of the vehicle, increasing the driving pleasure of the driver, and allowing for better economic efficiency and trafficability.

Technical solutions of this application are described as follows.

This application provides a multi-mode torque vectoring electric drive axle, comprising:
a main motor;
an auxiliary motor;
a first flange;
a second flange;
a first half shaft;
a second half shaft;
a differential;
a dual-gear mechanism;
a primary reducer;
a secondary reducer;
a three-phase actuator;
a planetary gear set; and
a main housing;
wherein the main motor is configured to output a driving torque to drive a vehicle;
the auxiliary motor is configured to output a torque to realize torque vectoring distribution; or configured to output a torque to be coupled with the driving torque output by the main motor to drive the vehicle;
the differential is configured to evenly distribute a torque transmitted to a differential housing to the first half shaft and the second half shaft, and allow the first half shaft and the second half shaft to rotate at different angular speeds;
the dual-gear mechanism is configured to perform deceleration and torque increase, and transmit a torque transmitted to the dual-gear mechanism to the differential housing;
the primary reducer is configured to perform deceleration and torque increase, and transmit the driving torque output by the main motor to the differential housing;
the secondary reducer is configured to perform deceleration and torque increase, and output the torque output by the auxiliary motor;

the three-phase actuator is configured to control switching of the multi-mode torque vectoring electric drive axle among a main-motor independent-drive mode, a dual-motor torque coupling mode and a torque vectoring mode;
the planetary gear set is configured to convert the torque output by the secondary reducer into a pair of opposite and unequal torques under control of the three-phase actuator, and apply one of the pair of torques to the first half shaft and the other of the pair of torques to the dual-gear mechanism; or directly output the torque output by the auxiliary motor to the dual-gear mechanism by means of planetary set locking, or realize self-decoupling and transmission disengagement;
the main housing is configured to accommodate the primary reducer, the secondary reducer, the planetary gear set, the differential, the dual-gear mechanism and the three-phase actuator, and fix the main motor and the auxiliary motor.

In an embodiment, the main motor is a hollow-shaft inner-rotor permanent magnet synchronous motor, and comprises a first rotor output shaft, a first stator, and a main motor housing; the main motor, the second flange, the second-half shaft are arranged on a first side of the differential; the driving torque output by the main motor is output via the first rotor output shaft; the main motor housing is boltedly fixed on a first side of the main housing, and an internal cavity of the main motor housing is configured to accommodate the first stator and the first rotor output shaft; and the second half shaft passes through a first hollow sleeve at a center of the main motor;

the auxiliary motor is a hollow-shaft inner-rotor permanent magnet synchronous motor, and comprises: a second rotor output shaft, a second stator, and an auxiliary motor housing; the auxiliary motor, the first flange, and the first half shaft are arranged on a second side of the differential; the torque output by the auxiliary motor is output via the second rotor output shaft; the auxiliary motor housing is boltedly fixed on a second side of the main housing; and an internal cavity of the auxiliary motor housing is configured to accommodate the second stator and the second rotor output shaft; and the first half shaft passes through a second hollow sleeve at a center of the auxiliary motor.

In an embodiment, a main body of the primary reducer is a single-row single-stage planetary gear mechanism, and comprises: a first sun gear, a first gear ring, a first planetary gear, a first planetary gear shaft, and a first planet carrier;

the first sun gear is in splined connection with the first rotor output shaft; the first gear ring is fixedly connected to the main housing; the first planetary gear is engaged with the first sun gear and the first gear ring for transmission; the first planetary gear shaft is configured to rotatably support the first planetary gear; the first planet carrier is configured to support the first planetary gear shaft; and a first side of the first planet carrier is fixedly connected to a first side of the differential housing.

In an embodiment, a second side of the first planet carrier is in splined connection with the first side of the differential housing; and a main body of the secondary reducer is a single-row single-stage planetary gear mechanism, and comprises: a second sun gear, a second gear ring, a second planetary gear, a second planetary gear shaft, and a second planet carrier; the second sun gear is in splined connection with the second rotor output shaft; the second gear ring is fixedly connected to the main housing; the second planetary gear is engaged with the second sun gear and the second gear ring for transmission; the second planetary gear shaft is configured to rotatably support the second planetary gear; the second planet carrier is configured to support the second planetary gear shaft, and act as an output end of the secondary reducer.

In an embodiment, a main body of the planetary gear set is a single-row single-stage planetary spur gear mechanism, and comprises: a third sun gear, a third gear ring, a third planetary gear, a third planetary gear shaft, and a third planet carrier; the third sun gear is configured for slidable engagement; the third gear ring is fixedly connected to an end of the second planet carrier; the third planetary gear is engaged with the second sun gear and the second gear ring for transmission; the third planetary gear shaft is configured to rotatably support the third planetary gear; the third planet carrier is configured to support the third planetary gear shaft.

In an embodiment, the dual-gear mechanism comprises: a first gear, a second gear, a dual gear, and a dual-gear shaft; wherein the first gear is fixedly connected to a side of the third planet carrier; the second gear is fixedly connected to a second side of the differential housing; the dual gear comprises a third gear and a fourth gear, wherein the fourth gear is bigger than the third gear; the third gear is in external engagement with the first gear for transmission, and the fourth gear is in external engagement with the second gear for transmission; and the dual-gear shaft is configured to rotatably support the dual gear, and is fixed on the main housing;

in order to ensure when the electric drive axle is switched to the torque vectoring mode, a torque increase of the first half shaft is equal to a torque decrease of the second half shaft or a torque decrease of the first shaft is equal to a torque increase of the second half shaft; the number of teeth on each gear in the dual-gear mechanism is required to meet the following condition:

$$\frac{Z_2 Z_4}{Z_1 Z_3} = \frac{1}{k_3 + 1};$$

wherein $Z_1$ is the number of teeth on the first gear; $Z_2$ is the number of teeth on the third gear; $Z_3$ is the number of teeth on the fourth gear; $Z_4$ is the number of teeth on the second the gear; and $k_3$ is a planetary-row characteristic parameter of the planetary gear set.

In an embodiment, the first gear and the third planet carrier are integrally formed, and the second gear and the differential housing are integrally formed.

In an embodiment, the three-phase actuator comprises:
a synchronizer;
a lead screw-nut assembly;
a shifting fork; and
an execution motor;

wherein the lead screw-nut assembly comprises a nut and a lead screw; the lead screw-nut assembly is configured to convert a rotation motion of the lead screw into a translational motion of the nut; and the nut and the lead screw are configured to realize reverse transmission and self-locking;

a fork head of the shifting fork has a half-ring shape; and a tail part of the shifting fork is fixedly connected to the nut; and a power output end of the execution motor is fixedly connected to the lead screw.

In an embodiment, the synchronizer comprises:
a splined hub;
a slide sleeve;
a spring;
a locking steel ball;
a first synchronizing ring;
a first engaging gear ring; and
a second engaging gear ring;

wherein an outer ring of the splined hub is provided with a first spline; a middle of the first spline is provided with a blind hole from outside to inside; and an inner ring of the splined hub is rotatably supported on the first half shaft;

the slide sleeve is cylindric; an inner ring of the slide sleeve is provided with a second spline; wherein a middle of the second spline is provided with an arc-shaped groove; the second spline is slidably connected to the first spline of the splined hub; a first side of an outer ring of the slide sleeve is fixedly connected to the third sun gear, and a second side of the outer ring of the slide sleeve is provided with a rectangular groove for connection with the fork head of the shifting fork; the slide sleeve is configured to perform translational motion among a first working phase, a second working phase and a third working phase, wherein the second working phase is between the first working phase and the third working phase;

the spring is arranged in the blind hole of the splined hub;
the locking steel ball is arranged in the blind hole of the splined hub and on an outer end of the spring; and the locking steel ball is configured to be stuck in the arc-shaped groove;

the first synchronizing ring is arranged on a first side of the splined hub; a side of the first synchronizing ring is provided with a first inner friction conical surface; a side of an outer ring of the first synchronizing ring is provided with first splined teeth; and the first splined teeth are configured for connection with the second spline when the shifting fork drives the slide sleeve to move along a first direction;

the second synchronizing ring is arranged on a second side of the splined hub; a side of the second synchronizing ring is provided with a second inner friction conical surface; a side of an outer ring of the second synchronizing ring is provided with second splined teeth; and the second splined teeth are configured for connection with the second spline when the shifting fork drives the slide sleeve to move, the second splined teeth are configured for connection to the inner spline of the slide sleeve to move along a second direction;

the first engaging gear ring is arranged at the side of the first synchronizing ring; a side of an outer ring of the first engaging gear ring is provided with third splined teeth; the third splined teeth are configured for connection with the second spline when the shifting fork drives the slide sleeve to move along the first direction; a first side of the first engaging gear ring is provided with the first outer friction conical surface; the first outer friction conical surface is opposite to a first inner friction conical surface; and a second side of the first engaging gear ring is fixedly connected to the second planet carrier;

the second engaging gear ring is arranged at the side of the second synchronizing ring; a side of an outer ring of the second engaging gear ring is provided with fourth splined teeth; the fourth splined teeth are configured for connection with the second spline when the shifting fork drives the slide sleeve to move along the second direction; a side of the second engaging gear ring is provided with a second outer friction conical surface; the second outer friction conical surface is opposite to the second inner friction conical surface; and an inner ring of the second engaging gear ring is provided with a third spline for splined connection with the first half shaft.

In an embodiment, the slide sleeve and the third sun gear are integrally formed; and the first engaging gear ring and the second planet carrier are integrally formed.

In an embodiment, the first flange is in splined connection with an outer end of the first half shaft; and the first flange is configured to output a torque of the first half shaft to wheels at a first side of the vehicle; a first locking nut is threadedly connected with the first half shaft at an outer center of the first flange, such that the first flange is axially fixed;

the second flange is in splined connection with an outer end of the second half shaft; and the second flange is configured to output a torque of the second half shaft to wheels at a second side of the vehicle; a second locking nut is threadedly connected with the second half shaft at an outer center of the second flange, such that the second flange is axially fixed;

This application provides another multi-mode torque vectoring electric drive axle, comprising:
 a main motor;
 an auxiliary motor;
 a first flange;
 a second flange;
 a first half shaft;
 a second half shaft;
 a differential;
 a primary reducer;
 a secondary reducer;
 a planetary gear set;
 a three-phase actuator;
 a dual-gear mechanism; and
 a main housing;

wherein the main motor is configured to output a driving torque to drive a vehicle;

the auxiliary motor is configured to output a torque to realize torque vectoring distribution; the auxiliary motor or configured to output a torque to be coupled with the driving torque output by the main motor;

the differential is configured to evenly distribute a torque transmitted to a differential housing to the first half shaft and the second half shaft, and allow the first half shaft and the second half shaft to rotate at different angular speeds;

the primary reducer is configured to perform deceleration and torque increase, and transmit the driving torque output by the main motor to the differential housing;

the secondary reducer is configured to perform deceleration and torque increase, and output the torque output by the auxiliary motor;

a main body of the planetary gear set is a single-row single-stage planetary gear mechanism, and comprises: a sun gear, a planetary gear, a first gear ring, a planetary gear shaft, and a planet carrier; the sun gear is configured for slidable engagement; the planetary gear is engaged with the sun gear for transmission; the first gear ring is engaged with the planetary gear for transmission; the planetary gear shaft is configured to rotatably support the planetary gear; the planet carrier is configured to support the planetary gear shaft, and is fixedly connected to an output end of the secondary reducer;

the three-phase actuator is configured to work in three working phases, consisting of a first working phase, a second working phase and a third working phase, wherein the second working phase is between the first working phase and the third working phase;

when the three-phase actuator works at the first working phase, the planet carrier is connected to the sun gear, and at this time, the multi-mode torque vectoring electric drive axle is switched to a dual-motor torque coupling drive mode;

when the three-phase actuator works in the second working phase, the planet carrier is separated from the sun gear, and at this time the multi-mode torque vectoring electric drive axle with the single actuator is switched to a main-motor independent-drive mode;

when the three-phase actuator works in the third working phase, the sun gear is connected to the first half shaft, and at this time the multi-mode torque vectoring electric drive axle is switched to a torque vectoring mode;

the dual-gear mechanism is configured to adjust magnitude and direction of a torque transmitted thereon and then transfer the torque to the differential; the dual-gear mechanism comprises a second gear ring, a first gear, a dual gear, and a dual-gear shaft; the second gear ring is fixedly connected to the first gear ring; the first gear is fixedly connected to a side of the differential housing; the dual gear comprises a second gear and a third gear; wherein the third gear is bigger than the second gear; the second gear is in internal engagement with the second gear ring for transmission, and the third gear is in external engagement with the first gear for transmission; the dual-gear shaft is configured to rotatably support the dual gear, and is fixedly provided on the main housing;

in order to ensure that when the multi-mode torque vectoring electric drive axle is switched to the torque vectoring mode, a torque increase of the first half shaft is equal to a torque decrease of the second half shaft or a torque decrease of the first half shaft is equal to a torque increase of the second half shaft, the number of teeth on each gear in the dual-gear mechanism is required to meet the following condition:

$$\frac{Z_2 Z_4}{Z_1 Z_3} = \frac{1}{k_3};$$

wherein $Z_1$ is the number of teeth on the second gear ring; $Z_2$ is the number of teeth on the second gear; $Z_3$ is the number of teeth on the third gear; $Z_4$ is the number of teeth on the first gear; and $k_3$ is a planetary-row characteristic parameter of the planetary gear set.

In an embodiment, the multi-mode torque vectoring electric drive axle provided herein is configured to realize three working modes consisting of a main-motor independent-drive mode; a dual-motor torque coupling mode and a torque vectoring mode. The multi-mode torque vectoring electric drive axle is switched among the three working modes. The working principles are illustrated as follows.

When the execution motor works, the lead screw is driven to rotate, such that the nut drives the shifting fork to translate, and the slide sleeve connected to the shifting fork also translates along an axial direction of the half shaft. Under the "synchronization" action of the synchronizer, the slide sleeve is configured to move along the first direction or the second direction, so as to be engaged with the first engaging gear ring or the second engaging gear ring respectively, or the slide sleeve is configured to be located in the middle and not engaged with the first engaging gear ring or the second engaging gear ring.

When the slide sleeve is located in the middle, and not engaged with the first engaging gear ring or the second engaging gear ring, the multi-mode torque vectoring electric drive axle is working under the main-motor independent-drive mode, and at this time the main motor outputs the torque, and the auxiliary motor does not participate in the transmission and maintains static. Under the main-motor independent-drive mode, the primary reducer is configured to perform deceleration and torque increase. Then, the torque output by the main motor is transmitted to the differential housing by the primary reducer, and evenly distributed to the first half shaft and the second half shaft through the bevel gear differential. At this time, a torque output by the first half shaft and a torque output by the second half shaft are required to meet the following condition:

$$T_l = T_r = \frac{1}{2}(k_1 + 1)T_{m1};$$

where $T_1$ is the torque output by the first half shaft; $T_r$ is the torque output by the second half shaft; $k_1$ is a planetary-row characteristic parameter of the primary reducer; and $T_{m1}$ is a torque output by the main motor.

When the slide sleeve is translated along the first direction and is engaged with the first engaging gear ring, the multi-mode torque vectoring electric drive axle is working under the dual-motor torque coupling mode. The main motor and the auxiliary motor output torque. Under the dual-motor torque coupling mode, the main motor rotates in a forward direction and outputs a forward torque (assuming that the main motor rotates in the forward direction, when the vehicle moving forward). The primary reducer is configured to perform deceleration and torque increase, and transmit the torque output by the main motor to the differential housing, which is then evenly distributed to the first half shaft and the second half shaft through a bevel gear differential. The torque output by the auxiliary motor is transmitted to the differential housing through the secondary reducer, the planetary gear set (locking) and the dual-gear mechanism, and then evenly distributed to the first half shaft and the second half shaft. At this time, a torque output by the first half shaft and a torque output by the second half shaft are required to meet the following condition:

$$T_l = T_r = \frac{1}{2}(k_1 + 1)T_{m1} + \frac{Z_2 Z_4}{2Z_1 Z_3}(k_2 + 1)|T_{m2}|;$$

wherein $Z_1$ is the number of teeth on the first gear (the second gear ring); the dual-gear mechanism comprises a third gear and a fourth gear; the third gear is smaller than the fourth gear; $Z_2$ is the number of teeth on the third gear; $Z_3$ is the number of teeth on the fourth gear; $Z_4$ is the number of teeth on the second gear; $k_2$ is a planetary-row characteristic parameter of the secondary reducer; and $T_{m2}$ is the torque output by the auxiliary motor.

When the slide sleeve is translated along the second direction and is engaged with the second engaging gear ring, the multi-mode torque vectoring electric drive axle is working under the torque vectoring mode. Under the mode of the torque vectoring mode, the primary reducer performs deceleration and torque increase. And the torque output by the main motor is transmitted to the differential housing by the primary reducer, and then evenly distributed to the first half shaft and the second half shaft. The secondary reducer performs deceleration and torque increase. Then, the torque output by the auxiliary motor is transmitted to the planetary gear set by the secondary reducer, and then converted into a pair of moments, where the pair of moments are unequal and opposite to each other and have the opposite directions (the pair of moments are unequal to each other and have the same direction). One of the pair of moments is directly transmitted to the first half shaft. After being converted into a torque that is equal to and opposite to the moment transmitted to the first half shaft passing through each gear of the two external engagement (or a pair of internal engagement and an external engagement) in the dual-gear mechanism, the other of the pair of moments is applied on the differential housing, and evenly distributed to the first half shaft and the second half shaft through the cone gear differential, so as to realize a torque vectoring distribution of the first half shaft and the second half shaft. The distribution direction of each of the first half shaft and the second half shaft is dependent on the direction of the torque output by the auxiliary motor.

Compared with the prior art, this application has the following beneficial effects.

1. The drive axle provided herein can achieve the torque vectoring distribution between left and right wheels on the centralized-drive electric vehicle by controlling an output torque of the auxiliary motor, such that the centralized-drive electric vehicles have similar dynamic controlling characteristics to the distributed-drive electric vehicles. In addition, compared with the traditional electronic stability program (ESP) technology, the drive axle provided herein avoids the power loss, and can effectively improve the dynamic, economic efficiency, handling stability, active safety and driving pleasure of the vehicle.

2. Regarding the drive axle provided herein, the switching among three working modes can be realized under the control of a single actuator, which effectively reduces the production cost and control difficulty. In addition, the drive axle provided herein only uses three planetary gear sets and a dual-gear mechanism, which facilitates improving the overall integration and structure compactness, and reducing the size, improving the utilization rate of the vehicle chassis space and facilitating the arrangement of the chassis.

3. The drive axle provided herein can operate under the main motor independent-drive mode and the dual-motor torque coupling mode. Under the working condition where the driving torque required by the vehicle is relatively small, the drive axle is switched to the main motor independent-drive mode, and the main motor drives the vehicle alone, which can effectively improve the load rate of the main motor, so as to allow the main motor to work in the high-efficiency range and enhance the economic efficiency of the vehicle.

Under the working condition where the driving torque required by the vehicle is relatively large, the drive axle is switched to the dual-motor torque coupling mode, and the torque of the main motor is coupled with the torque of the auxiliary motor, such that the vehicle has better acceleration performance and climbing ability, and stronger dynamic, and the high-efficiency locking of the planetary gear set is fully utilized, so as to improve the drive efficiency. In addition, through the distribution and regulation of the coupled power of the two motors, their respective high-efficiency ranges can be fully utilized to achieve more high-efficiency and energy-saving driving.

DETAILED DESCRIPTION OF EMBODIMENTS

This application will be described in detail below with reference to the accompanying drawings and embodiments to enable those skilled in the art to implement the technical solutions disclosed herein.

Embodiment 1

Figure 1:
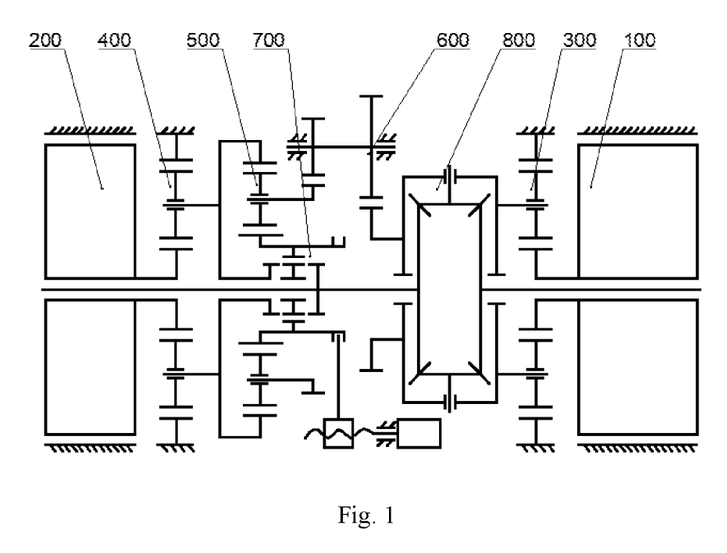
FIG. 1 is a simplified structural diagram of a multi-mode torque vectoring electric drive axle according to Embodiment 1 of this application.
Figure 2:
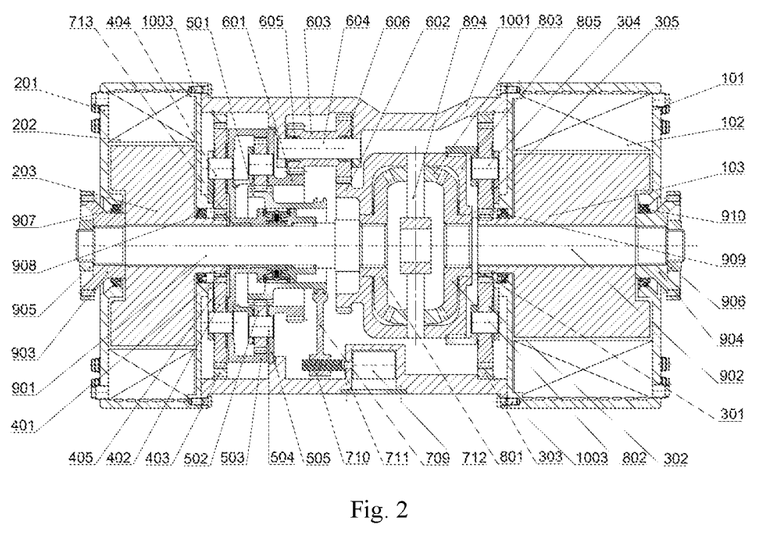
FIG. 2 is a structural diagram of the multi-mode torque vectoring electric drive axle according to Embodiment 1 of this application.
Figure 3:
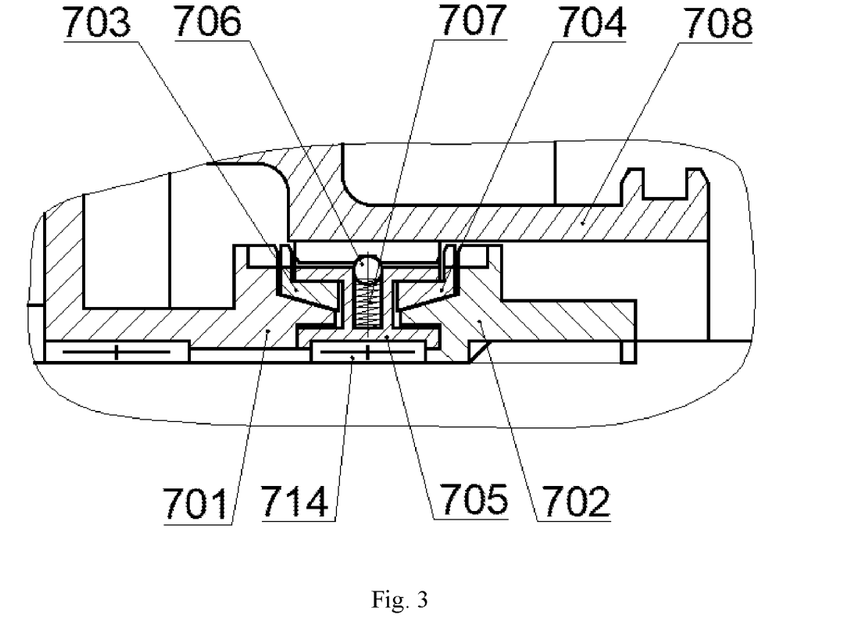
FIG. 3 is a partial structure diagram of the multi-mode torque vectoring electric drive axle according to Embodiment 1 of this application.

Referring to FIGS. 1-3, a torque vectoring electric drive axle using planetary gear sets and a dual gear is provided, which includes a main motor 100, an auxiliary motor 200, a first flange 903, a second flange 904, a first half shaft 901, a second-half shaft 902, a bevel gear differential 800, a dual-gear mechanism 600, a primary reducer 300, a secondary reducer 400, a planetary gear set 500, a three-phase actuator 700 and a main housing 1001.

The main housing 1001 is configured to accommodate the primary reducer 300, the secondary reducer 400, the planetary gear set 500, the bevel gear differential 800, the dual-gear mechanism 600 and the three-phase actuator 700, and fix the main motor 100 and the auxiliary motor 200.

The main motor 100 is a hollow-shaft inner-rotor permanent magnet synchronous motor. The main motor 100, the second flange 904 and the second half shaft 902 are all arranged at a right side of the bevel gear differential 800. A torque generated by the main motor 100 is output through a first rotor output shaft 103. A main motor housing 101 is fixed on a right side of the main housing 1001 by bolts 1003. An internal cavity of the main motor housing is configured to accommodate a first stator 102 and the first rotor output shaft 103. The second half shaft 902 passes through a first hollow sleeve of the main motor 100. The first rotor output shaft 103 is sealed in a through hole at a center of a left side of the main motor housing 101 by a first rubber seal ring 909.

The auxiliary motor 200 is a hollow-shaft inner-rotor permanent magnet synchronous motor. The main motor 100, the first flange 903 and the first half shaft 901 are all arranged at a left side of the bevel gear differential 800. A torque generated by the auxiliary motor 200 is output through a second rotor output shaft 203. An auxiliary motor housing 201 is fixed on a left side of the main housing 1001 by bolts 1002. An internal cavity of the auxiliary motor housing 201 is configured to accommodate a second stator 202 and the second rotor output shaft 203. The first half shaft 903 passes through a second hollow sleeve of the auxiliary motor 200. The second rotor output shaft 203 is sealed in a through hole at a center of a right side of the auxiliary motor housing 201 by a second rubber seal ring 908.

The bevel gear differential 800 is a differential composed of a planetary bevel gear mechanism, and includes a first sun bevel gear 801, a second sun bevel gear 802, planetary bevel gears 803, a cross-shaped planet carrier 804 and a differential housing 805. The first sun bevel gear 801 is in splined connection with an inner end of the first half shaft 901. The second sun bevel gear 802 is in splined connection with an inner end of the second half shaft 902. The number of the planetary bevel gears 803 is four, all the four planetary bevel gears 803 are evenly arranged on the cross-shaped planet carrier 804, and engaged with the first sun bevel gear 801 and the second sun bevel gear 802 for transmission. The cross-shaped planet carrier 804 is configured to rotatably support the four planetary bevel gears 803. A middle of the differential housing 805 is provided with a through hole to mount and fix the cross-shaped planet carrier 804. A left side of the differential housing 805 is processed into a second gear 602, and a right side of the differential housing 805 is provided with external splines.

The primary reducer 300 is a single-row single-stage planetary gear mechanism, and includes a first sun gear 301, a first planetary gear 302, a first gear ring 303, a first planetary gear shaft 304 and a first planet carrier 305. The first sun gear 301 is in splined connection with the first rotor output shaft 103. The first gear ring 303 is fixedly connected to the main housing 1001 by a spline. The first planetary gear 302 is engaged with the first sun gear 301 and the first gear ring 303 for transmission. The first planetary gear shaft 304 is configured to rotatably support the first planetary gear 302. A right side of the first planet carrier 305 is rotatably supported on the main motor housing 101 to rotatably support the first planetary gear shaft 304, and a left side of the first planet carrier 305 is provided with an inner spline to connected to an external spline on a right side of the differential housing 805.

The secondary reducer 400 is a single-row single-stage planetary gear mechanism, and includes a second sun gear 401, a second planetary gear 402, a second gear ring 403, a second planetary gear shaft 404 and a second planet carrier 405. The second sun gear 401 is in splined connection with the second rotor output shaft 203. The second gear ring 403 is fixedly connected to the main housing 1001 by a spline. The second planetary gear 402 is engaged with the second sun gear 401 and the second gear ring 403 for transmission. The second planetary gear shaft 404 is configured to rotatably support the second planetary gear 402. A right side of the second planet carrier 405 is rotatably supported on the auxiliary motor housing 203 to rotatably support the second planetary gear shaft 404, and an external end of a right side of the second planet carrier 405 is processed as a third gear ring 503, and an internal end of the right side of the second planet carrier 405 is processed as a first engaging gear ring 701.

The planetary gear set 500 is a single-row single-stage planetary spur gear mechanism, and includes a third sun gear 501, a third planetary gear 502, a third gear ring 503, a third planetary gear shaft 504 and a third planet carrier 505. The tooth width of the third sun gear 501 is wider than the third planetary gear 502, and has better processing quality on the tooth surface, enabling the slidable engagement. The third planetary gear 502 is engaged with the third sun gear 501 and the third planetary gear 502 for transmission. The third planetary gear shaft 504 is configured to rotatably support the third planetary gear 502. The third planet carrier 505 is configured to support the third planetary gear shaft 504. A right end of the third planet carrier 505 is processed into a first gear 601.

The dual-gear mechanism 600 includes a first gear 601, a second gear 602, a dual gear 603, a dual-gear shaft 604, a first needle bearing 605 and a second needle bearing 606. The second gear 602 is integrated with the differential housing 805. The dual gear 603 is rotatably supported on the dual-gear shaft 604 by the first needle bearing 605 and the second needle bearing 606. The dual gear includes a third gear and a fourth gear, where the third gear is smaller than the fourth gear. The third gear is in external engagement with the first gear 601 for transmission, and the fourth gear is in external engagement with the second gear 602 for transmission. The dual-gear shaft 604 is fixed on the main housing 1001. In order to ensure that when the electric drive axle is switched to the torque vectoring mode, a torque increase of the first half shaft is equal to a torque decrease of the second half shaft or a torque decrease of the first half shaft is equal to a torque increase of the second half shaft, the number of teeth on each gear in the dual-gear mechanism 600 is required to meet the following condition:

$$\frac{Z_2 Z_4}{Z_1 Z_3} = \frac{1}{k_3 + 1};$$

where $Z_1$ is the number of teeth on the first gear 601; $Z_2$ is the number of teeth on the third gear of the dual gear 603; $Z_3$ is the number of teeth on the fourth gear of the dual gear 603; $Z_4$ is the number of teeth on the second gear 602; and $k_3$ is a planetary-row characteristic parameter of the planetary gear set 500.

The three-phase actuator 700 includes a synchronizer, a shifting fork 709, a lead screw-nut assembly and an execution motor 712. The lead screw-nut assembly includes a nut 710 and a lead screw 711. A through hole at a center of the nut 710 is provided with an inner rolled thread, which is connected to an outer rolled thread of the lead screw 711. In addition, the nut 710 and the lead screw 711 are configured to realize self-locking. A fork head of the shifting fork 709 has a half-ring shape, and a tail part of the shifting fork 709 is fixedly connected to the nut 710. An output end of the execution motor 712 is fixedly connected to the lead screw 711.

The synchronizer includes a splined hub 705, a slide sleeve 708, a spring 707, a locking steel ball 706, a first synchronizing ring 703, a second synchronizing ring 704, a first engaging gear ring 701, and a second engaging gear ring 702. An outer ring of the splined hub 705 is provided with a first spline. The first spline is provided with a blind hole from outside to inside, and an inner ring of the splined hub 705 is rotatably supported on the first half shaft 901 by a third needle bearing 714. The slide sleeve 708 is cylindric. An inner ring of the slide sleeve 708 is provided with a second spline, where a middle of the second spline is provided with an arc-shaped groove. The second spline is slidably connected to the first spline of the splined hub 705. A left side of an outer ring of the slide sleeve 708 is fixedly connected to a third sun gear 501, and a right side of the outer ring of the slide sleeve 708 is provided with a groove for connection with the fork head of the shifting fork 709. The spring 707 is arranged in the blind hole of the splined hub 705. The locking steel ball 706 is arranged in the blind hole of the splined hub 705 and on an outer end of the spring 707. And the locking steel ball 706 is configured to be stuck in the arc-shaped groove in the second spline of the slide sleeve 708. The first synchronizing ring 703 is mounted on a left side of the splined hub 705. A left side of the first synchronizing ring 703 is provided with a first friction conical surface. The second synchronizing ring 704 is mounted on a right side of the splined hub 705. A right side of the second synchronizing ring 704 is provided with a second friction conical surface. The first engaging gear ring 701 is mounted on a left side of the first synchronizing ring 703, and a right side of the first engaging gear ring 701 is provided with a third friction conical surface, which is opposite to the first friction conical surface. The second engaging gear ring 702 is mounted on a right side of the second synchronizing ring 704, and a left side of the second engaging gear ring 702 is provided with a fourth friction conical surface, which is opposite to the second friction conical surface. An internal end of the second engaging gear ring 702 is provided with a spline that is in splined connected with the first half shaft 901.

The first flange 903 is in splined connection to an outer end of the first half shaft 901 to output the torque of the first half shaft 901 to the wheels at a left side of the vehicle. A first end fixing nut 905 is threadedly connected to the first half shaft 901 at a center of an outer side of the first flange 903 to make the first flange 903 axially fixed. The first flange 903 is sealed in a through hole at a center of a left side of the auxiliary motor housing 201 by a third rubber seal ring 906.

The second flange 904 is in splined connection to an outer end of the second half shaft 902 to output the torque of the second half shaft 902 to the wheels at a right side of the vehicle. A second end fixing nut 906 is threadedly connected to the second half shaft 902 at a center of an outer side of the second flange 904 to make the second flange 904 axially fixed. The second flange 904 is sealed in a through hole at a center of a right side of the main motor housing 101 by a fourth rubber seal ring 910.

Embodiment 2

Figure 4:
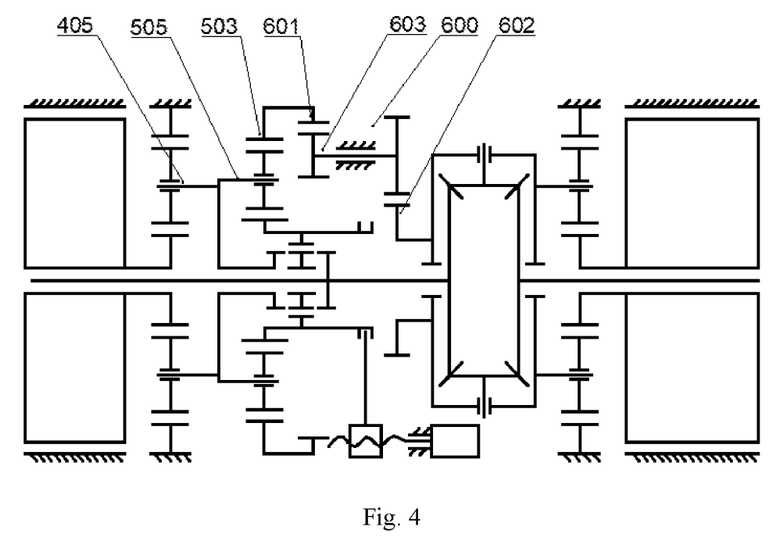
FIG. 4 is a simplified structural diagram of a multi-mode torque vectoring electric drive axle according to Embodiment 2 of this application.

Referring to an embodiment shown in FIG. 4, the third planet carrier 505 is fixedly connected to a right side of the second planet carrier 405. The third gear ring 503 is fixedly connected to the fourth gear ring 601.

The dual gear 603 of the dual-gear mechanism 600. The dual gear 603 includes a fifth gear and a sixth gear, where the fifth gear is smaller than the sixth gear. The fifth gear is in internal engagement with the fourth gear ring 601 for transmission, and the sixth gear is in external engagement with the second gear 602. In order to ensure that when the electric drive axle is switched to the torque vectoring mode, a torque increase of the first half shaft is equal to a torque decrease of the second half shaft or a torque decrease of the first half shaft is equal to a torque increase of the second half shaft, the number of teeth on each gear in the dual-gear mechanism 600 is required to meet the following condition:

$$\frac{Z_2 Z_4}{Z_1 Z_3} = \frac{1}{k_3},$$

where $Z_1$ is the number of teeth on the fourth gear ring 601; $Z_2$ is the number of teeth on the fifth gear of the dual gear 603; $Z_3$ is the number of teeth on the sixth gear of the dual gear 603; $Z_4$ is the number of teeth on the second gear; and $k_3$ is a planetary-row characteristic parameter of the planetary gear set 500.

Other structures in the Embodiment 2 are basically the same as those in the Embodiment 1.

The technical solutions shown in FIGS. 1 and 3-4 are all achievable structural solutions of the torque vectoring electric drive axle using a planetary gear set and a dual gear provided in this application. However, taking the transmission ratio and structure arrangements into consideration, Embodiment 1 shown in FIG. 1 is the optimal solution.

Taking Embodiment 1 as an example, the working principle of the torque vectoring electric drive axle using a planetary gear set and a dual gear is further described in detail with reference to the accompanying drawings.

As shown in the figures, when the execution motor 712 is working, the lead screw 711 is driven to rotate, such that the nut 710 drives the shift fork 709 to translate, and the slide sleeve 708 connected to the shifting fork 709 also translates along an axial direction of the first half shaft or the second half shaft. However, the slide sleeve 708 is configured to move along the first direction or the second direction under the "synchronization" action of the synchronizer, so as to be engaged with the first engaging gear ring 701 or the second engaging gear ring 702, or it can be located in the middle, and not engaged with the first engaging gear ring 701 or the second engaging gear ring 702.

Figure 5:
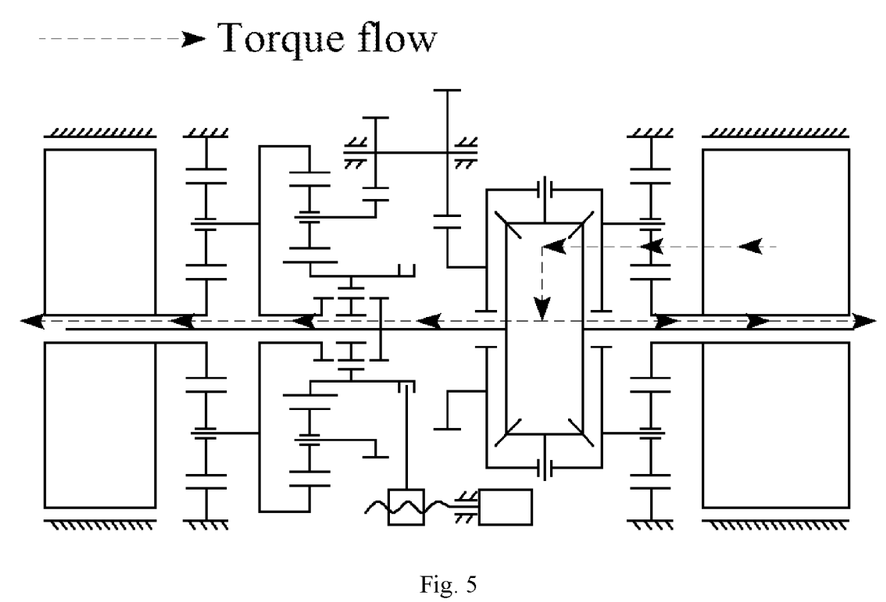
FIG. 5 shows a torque flow of the multi-mode torque vectoring electric drive axle under a main motor independent-drive mode according to Embodiment 1 of this application.

When the slide sleeve 708 is located at the middle and is not engaged with the first engaging gear ring 701 or the second engaging gear ring 702, the multi-mode torque vectoring electric drive axle works in the main-motor independent-drive mode. At this time, the main motor 100 outputs torque, and the auxiliary motor 200 does not participate in the transmission and maintains a static state. Under the main-motor independent-drive mode, the primary reducer 300 performs deceleration and torque increase. Then, the torque output by the main motor 100 is transmitted to the differential housing 805 by the primary reducer 300, and evenly distributed to the first half shaft and the second half shaft through the bevel gear differential 800. At this time, a torque output by the first half shaft 901 and a torque output by the second half shaft 902 are required to meet the following condition:

$$T_l = T_r = \frac{1}{2}(k_1 + 1)T_{m1};$$

where $T_l$ is the torque output by the first half shaft 901; $T_r$ is the torque output by the second half shaft 902; $k_1$ is a planetary-row characteristic parameter of the primary reducer 300; and $T_{m1}$ is a torque output by the main motor 100.

Figure 6:
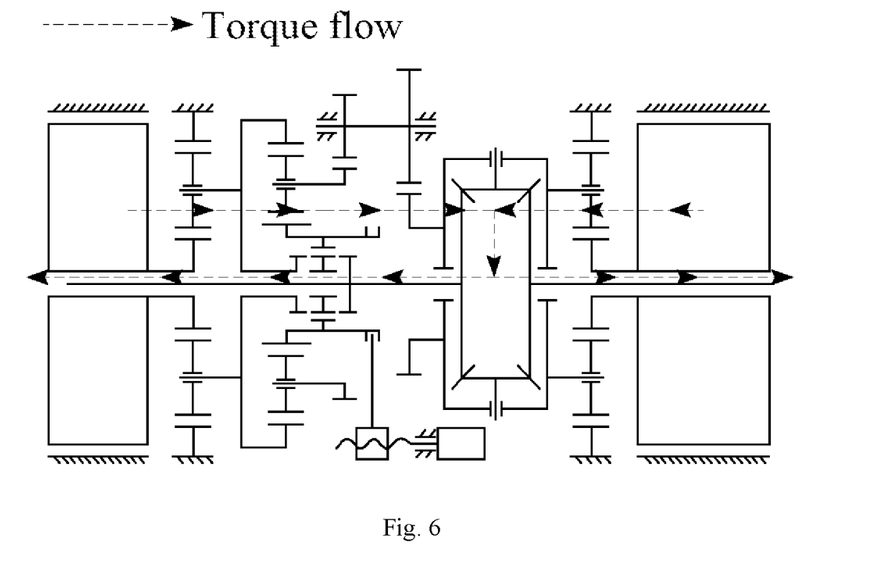
FIG. 6 shows a torque flow of the multi-mode torque vectoring electric drive axle under a dual-motor torque coupling mode according to Embodiment 1 of this application.

When the slide sleeve 708 translates to the left and is engaged with the first engaging gear ring 701, the multi-mode torque vectoring electric drive axle is working under the dual-motor torque coupling mode. The main motor 100 and the auxiliary motor 200 output torque. Under the dual-motor torque coupling mode, the main motor 100 rotates in a forward direction and outputs a forward torque (assuming that when the vehicle is moving forward, the main motor rotates forward). The primary reducer 300 is configured to perform deceleration and torque increase. And then, the torque output by the main motor 100 is transmitted to the differential housing 805 by the primary reducer 300, and then evenly distributed to the first half shaft 901 and the second half shaft 902 through a bevel gear differential 800. The torque output by the auxiliary motor 200 is transmitted to the differential housing 805 through the secondary reducer 400, the planetary gear set 500 and the dual-gear mechanism 600, and then evenly distributed to the first half shaft 901 and the second half shaft 902. At this time, a torque output by the first half shaft 901 and a torque output by the second half shaft 902 are required to meet the following condition:

$$T_l = T_r = \frac{1}{2}(k_1 + 1)T_{m1} + \frac{Z_2 Z_4}{2 Z_1 Z_3}(k_2 + 1)|T_{m2}|;$$

where $Z_1$ is the number of teeth on the first gear; the dual-gear mechanism includes a seventh gear and an eighth gear; the seventh gear is bigger than the eighth gear; $Z_2$ is the number of teeth on the seventh gear; $Z_3$ is the number of teeth on the eighth gear; $Z_4$ is the number of teeth on the second gear; $k_2$ is a planetary-row characteristic parameter of the secondary reducer 400; and $T_{m2}$ is the torque output by the auxiliary motor 200.

Figure 7:
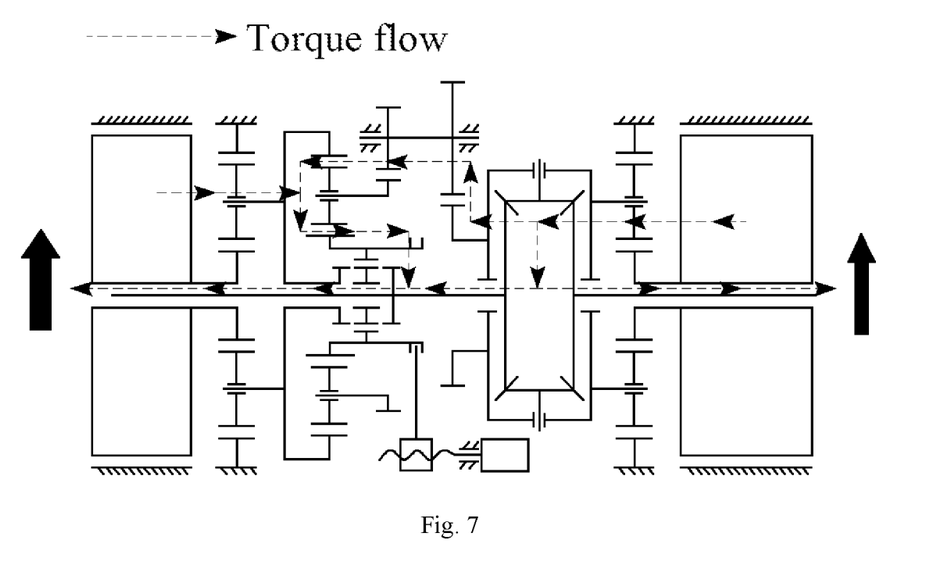
FIG. 7 shows a torque flow of the multi-mode torque vectoring electric drive axle according to Embodiment 1 of this application under a torque vectoring mode in which torque increase is performed on left wheels.
Figure 8:
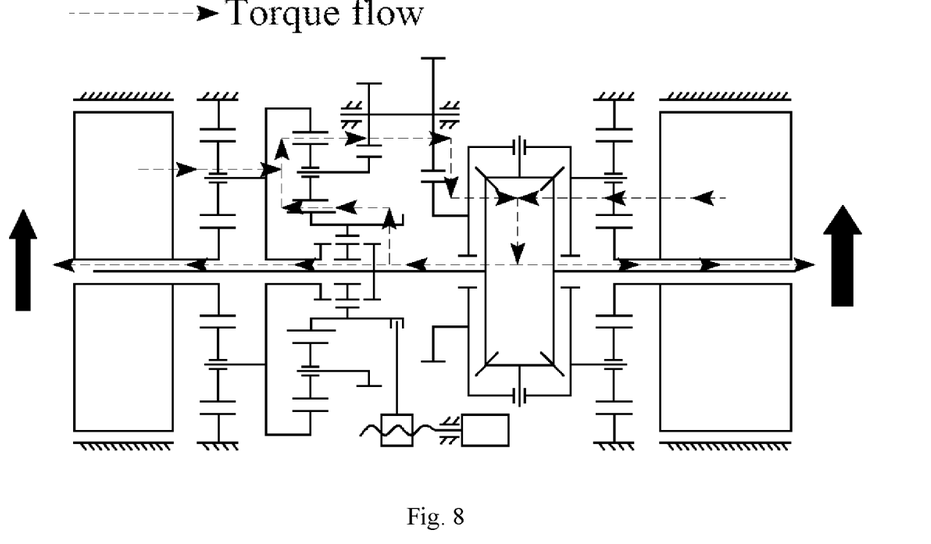
FIG. 8 shows a torque flow of the multi-mode torque vectoring electric drive axle according to Embodiment 1 of this application under a torque vectoring mode in which torque increase is performed on right wheels.

When the slide sleeve 708 translates to the right and is engaged with the second engaging gear ring 702, the multi-mode torque vectoring electric drive axle is working under the torque vectoring mode. Under the mode of the torque vectoring mode, the primary reducer 300 performs deceleration and torque increase. The torque output by the main motor 100 is transmitted to the differential housing 805 by the primary reducer 300, and then evenly distributed to the first half shaft 901 and the second half shaft 902. The secondary reducer 400 performs deceleration and torque increase. Then the torque output by the auxiliary motor 200 is transmitted to the planetary gear set 500 by the secondary reducer, and then transformed into a pair of moments, where the pair of moments are unequal and have opposite directions. One of the pair of moments is directly transmitted to the first half shaft 901. After being transformed into a torque that is equal to and opposite to the moment transmitted to the first half shaft 901 passing through each gear of the two external engagement in the dual-gear mechanism 600, the other of the pair of moments is applied on the differential housing 805, and evenly distributed to the first half shaft and the second half shaft through the cone gear differential 800, so as to realize a torque vectoring distribution of the first half shaft and the second half shaft. At this time, a torque output by the first half shaft 901 is required to meet the following condition:

$$T_l = \frac{1}{2}(k_1 + 1)T_{m1} - \frac{1}{k_3}(k_2 + 1)T_{m1};$$

a torque output by the second half shaft 902 is required to meet the following condition:

$$T_r = \frac{1}{2}(k_1 + 1)T_{m1} + \frac{1}{k_3}(k_2 + 1)T_{m1}.$$

At this time, the direction of the torque vectoring distribution of the first half shaft or the second half shaft depends on the direction of the torque output by the auxiliary motor 200.

When the auxiliary motor 200 outputs a reverse torque, the torque of the first half shaft 901 increases, and the torque of the second half shaft 902 decreases, and when the auxiliary motor 200 outputs a forward torque, the torque of the first half shaft 901 decreases, and the torque of the second half shaft 902 increases.

Although the embodiments of this application are disclosed above, this application is not limited to embodiments described in description and is completely applicable to various fields suitable for this application. It should be understood that various modifications made by those skilled in the art without departing from the spirit and scope of this application shall fall within the scope of this application defined by the appended claims.

What is claimed is:

1. A multi-mode torque vectoring electric drive axle, comprising:
   a main motor;
   an auxiliary motor;
   a first flange;
   a second flange;
   a first half shaft;
   a second half shaft;
   a differential;
   a dual-gear mechanism;
   a primary reducer;
   a secondary reducer;
   a three-phase actuator;
   a planetary gear set; and
   a main housing;
   wherein the main motor is configured to output a driving torque to drive a vehicle;
   the auxiliary motor is configured to output a torque to realize torque vectoring distribution, or configured to output a torque to be coupled with the driving torque output by the main motor to drive the vehicle;
   the differential is configured to evenly distribute a torque transmitted to a differential housing to the first half shaft and the second half shaft, and allow the first half shaft and the second half shaft to rotate at different angular speeds;
   the dual-gear mechanism is configured to perform deceleration and torque increase, and transmit a torque transmitted to the dual-gear mechanism to the differential housing;
   the primary reducer is configured to perform deceleration and torque increase, and transmit the driving torque output by the main motor to the differential housing;
   the secondary reducer is configured to perform deceleration and torque increase, and output the torque output by the auxiliary motor;
   the three-phase actuator is configured to control switching of the multi-mode torque vectoring electric drive axle among a main-motor independent-drive mode, a dual-motor torque coupling mode and a torque vectoring mode;
   the planetary gear set is configured to convert the torque output by the secondary reducer into a pair of opposite and unequal torques under control of the three-phase actuator, and apply one of the pair of torques to the first half shaft and the other of the pair of torques to the dual-gear mechanism; directly output the torque output by the auxiliary motor to the dual-gear mechanism by means of planetary set locking; or realize self-decoupling and transmission disengagement;
   the main housing is configured to accommodate the primary reducer, the secondary reducer, the planetary gear set, the differential, the dual-gear mechanism and the three-phase actuator, and fix the main motor and the auxiliary motor.

2. The multi-mode torque vectoring electric drive axle of claim 1, wherein the main motor is a hollow-shaft inner-rotor permanent magnet synchronous motor, and comprises a first rotor output shaft, a first stator, and a main motor housing; the main motor, the second flange, and the second half shaft are arranged on a first side of the differential; the driving torque of the main motor is output via the first rotor output shaft; the main motor housing is boltedly fixed on a first side of the main housing, and an internal cavity of the main motor housing is configured to accommodate the first stator and the first rotor output shaft; and the second half shaft passes through a first hollow sleeve at a center of the main motor;
   the auxiliary motor is a hollow-shaft inner-rotor permanent magnet synchronous motor, and comprises a second rotor output shaft, a second stator, and an auxiliary motor housing; the auxiliary motor, the first flange, and the first half shaft are arranged on a second side of the differential; the torque output by the auxiliary motor is output via the second rotor output shaft; the auxiliary motor housing is boltedly fixed on a second side of the main housing, and an internal cavity of the auxiliary motor housing is configured to accommodate the second stator and the second rotor output shaft; and the first half shaft passes through a second hollow sleeve at a center of the auxiliary motor.

3. The multi-mode torque vectoring electric drive axle of claim 2, wherein a main body of the primary reducer is a single-row single-stage planetary gear mechanism, and comprises: a first sun gear, a first gear ring, a first planetary gear, a first planetary gear shaft, and a first planet carrier;
   the first sun gear is in splined connection with the first rotor output shaft; the first gear ring is fixedly connected to the main housing; the first planetary gear is engaged with the first sun gear and the first gear ring for transmission; the first planetary gear shaft is configured to rotatably support the first planetary gear; the first planet carrier is configured to support the first planetary gear shaft; and a side of the first planet carrier is fixedly connected to a first side of the differential housing;
   a main body of the secondary reducer is a single-row single-stage planetary gear mechanism, and comprises a second sun gear, a second gear ring, a second planetary gear, a second planetary gear shaft, and a second planet carrier;
   the second sun gear is in splined connection with the second rotor output shaft; the second gear ring is fixedly connected to the main housing; the second planetary gear is engaged with the second sun gear and the second gear ring for transmission; the second planetary gear shaft is configured to rotatably support the second planetary gear; the second planet carrier is configured to support the second planetary gear shaft, and act as an output end of the secondary reducer.

4. The multi-mode torque vectoring electric drive axle of claim 3, wherein a main body of the planetary gear set is a single-row single-stage planetary spur gear mechanism, and comprises a third sun gear, a third gear ring, a third planetary gear, a third planetary gear shaft, and a third planet carrier;
   the third sun gear is configured for slidable engagement; the third gear ring is fixedly connected to an end of the second planet carrier; the third planetary gear is engaged with the second sun gear and the second gear ring for transmission; the third planetary gear shaft is configured to rotatably support the third planetary gear; and the third planet carrier is configured to support the third planetary gear shaft.

5. The multi-mode torque vectoring electric drive axle of claim 4, wherein the dual-gear mechanism comprises a first gear, a second gear, a dual gear, and a dual-gear shaft;
wherein the first gear is fixedly connected to a side of the third planet carrier; the second gear is fixedly connected to a second side of the differential housing; the dual gear comprises a third gear and a fourth gear, wherein the fourth gear is bigger than the third gear; the third gear is in external engagement with the first gear for transmission, and the fourth gear is in external engagement with the second gear for transmission; and the dual-gear shaft is configured to rotatably support the dual gear, and is fixed on the main housing;
in order to ensure that when the electric drive axle is switched to the torque vectoring mode, a torque increase of the first half shaft is equal to a torque decrease of the second half shaft or a torque decrease of the first half shaft is equal to a torque increase of the second half shaft; the number of teeth on each gear in the dual-gear mechanism is required to meet the following condition:

$$\frac{Z_2 Z_4}{Z_1 Z_3} = \frac{1}{k_3 + 1};$$

wherein $Z_1$ is the number of teeth on the first gear; $Z_2$ is the number of teeth on the third gear; $Z_3$ is the number of teeth on the fourth gear; $Z_4$ is the number of teeth on the second gear; and $k_3$ is a planetary-row characteristic parameter of the planetary gear set.

6. The multi-mode torque vectoring electric drive axle of claim 4, wherein the three-phase actuator comprises:
a synchronizer;
a lead screw-nut assembly;
a shifting fork; and
an execution motor;
wherein the lead screw-nut assembly comprises a nut and a lead screw; the lead screw-nut assembly is configured to convert a rotation motion of the lead screw into a translational motion of the nut; and the nut and the lead screw are configured to realize reverse transmission and self-locking;
a fork head of the shifting fork has a half-ring shape; and a tail part of the shifting fork is fixedly connected to the nut; and
a power output end of the execution motor is fixedly connected to the lead screw.

7. The multi-mode torque vectoring electric drive axle of claim 6, wherein the synchronizer comprises:
a splined hub;
a slide sleeve;
a spring;
a locking steel ball;
a first synchronizing ring;
a second synchronizing ring;
a first engaging gear ring; and
a second engaging gear ring;
wherein an outer ring of the splined hub is provided with a first spline; a middle of the first spline is provided with a blind hole from outside to inside; and an inner ring of the splined hub is rotatably supported on the first half shaft;
the slide sleeve is cylindric, and an inner ring of the slide sleeve is provided with a second spline; wherein a middle of the second spline is provided with an arc-shaped groove; the second spline is slidably connected to the first spline of the splined hub; a first side of an outer ring of the slide sleeve is fixedly connected to the third sun gear, and a second side of the outer ring of the slide sleeve is provided with a rectangular groove for connection with the fork head of the shifting fork; the slide sleeve is configured to be driven by the fork head of the shifting fork to perform translational motion among a first working phase, a second working phase and a third working phase, wherein the second working phase is between the first working phase and the third working phase;
the spring is arranged in the blind hole of the splined hub;
the locking steel ball is arranged in the blind hole of the splined hub and on an outer end of the spring; and the locking steel ball is configured to be stuck in the arc-shaped groove;
the first synchronizing ring is arranged on a first side of the splined hub; a side of the first synchronizing ring is provided with a first inner friction conical surface; a side of an outer ring of the first synchronizing ring is provided with first splined teeth; and the first splined teeth are configured for connection with the second spline when the shifting fork drives the slide sleeve to move along a first direction;
the second synchronizing ring is arranged on a second side of the splined hub; a side of the second synchronizing ring is provided with a second inner friction conical surface; a side of an outer ring of the second synchronizing ring is provided with second splined teeth; and the second splined teeth are configured for connection with the second spline when the shifting fork drives the slide sleeve to move along a second direction;
the first engaging gear ring is arranged at the side of the first synchronizing ring; a side of an outer ring of the first engaging gear ring is provided with third splined teeth; the third splined teeth are configured for connection with the second spline when the shifting fork drives the slide sleeve to move along the first direction; a first side of the first engaging gear ring is provided with a first outer friction conical surface; the first outer friction conical surface is opposite to the first inner friction conical surface; and a second side of the first engaging gear ring is fixedly connected to the second planet carrier;
the second engaging gear ring is arranged at the side of the second synchronizing ring; a side of an outer ring of the second engaging gear ring is provided with fourth splined teeth; the fourth splined teeth are configured for connection with the second spline when the shifting fork drives the slide sleeve to move along the second direction; a side of the second engaging gear ring is provided with a second outer friction conical surface; the second outer friction conical surface is opposite to the second inner friction conical surface; and an inner ring of the second engaging gear ring is provided with a third spline for splined connection with the first half shaft.

8. The multi-mode torque vectoring electric drive axle of claim 1, wherein the first flange is in splined connection with an outer end of the first half shaft to output a torque of the first half shaft to wheels at a first side of the vehicle; the first flange is axially locked on the first half shaft through a first locking nut; the second flange is in splined connection with an outer end of the second half shaft to output a torque of the second half shaft to wheels at a second side of the vehicle; and the second flange is axially locked on the second half shaft through a second locking nut.

9. The multi-mode torque vectoring electric drive axle of claim 7, wherein when the slide sleeve is not engaged with the first engaging gear ring and the second engaging gear ring, the multi-mode torque vectoring electric drive axle works under the main motor independent-drive mode;

when the slide sleeve translates along the first direction to be engaged with the first engaging gear ring, the multi-mode torque vectoring electric drive axle works under the dual-motor torque coupling mode; and when the slide sleeve translates along the second direction to be engaged with the second engaging gear ring, the multi-mode torque vectoring electric drive axle works under the torque vectoring mode.

10. A multi-mode torque vectoring electric drive axle, comprising:
a main motor;
an auxiliary motor;
a first flange;
a second flange;
a first half shaft;
a second half shaft;
a differential;
a primary reducer;
a secondary reducer;
a planetary gear set;
a three-phase actuator;
a dual-gear mechanism; and
a main housing;
wherein the main motor is configured to output a driving torque to drive a vehicle;
the auxiliary motor is configured to output a torque to realize torque vectoring distribution, or configured to output a torque to be coupled with the driving torque output by the main motor;
the differential is configured to evenly distribute a torque transmitted to a differential housing to the first half shaft and the second half shaft, and allow the first half shaft and the second half shaft to rotate at different angular speeds;
the primary reducer is configured to perform deceleration and torque increase, and transmit the driving torque output by the main motor to the differential housing;
the secondary reducer is configured to perform deceleration and torque increase, and then output the torque output by the auxiliary motor;
a main body of the planetary gear set is a single-row single-stage planetary gear mechanism, and comprises: a sun gear, a planetary gear, a first gear ring, a planetary gear shaft, and a planet carrier;
the sun gear is configured for slidable engagement; the planetary gear is engaged with the sun gear for transmission; the first gear ring is engaged with the planetary gear for transmission; the planetary gear shaft is configured to rotatably support the planetary gear; the planet carrier is configured to support the planetary gear shaft, and is fixedly connected to an output end of the secondary reducer;

the three-phase actuator is configured to work in three working phases, consisting of a first working phase, a second working phase and a third working phase, wherein the second working phase is between the first working phase and the third working phase;

when the three-phase actuator works at the first working phase, the planet carrier is connected to the sun gear, and at this time the multi-mode torque vectoring electric drive axle is switched to a dual-motor torque coupling drive mode;

when the three-phase actuator works at the second working phase, the planet carrier is separated from the sun gear, and at this time the multi-mode torque vectoring electric drive axle is switched to a main motor independent-drive mode;

when the three-phase actuator works at the third working phase, the sun gear is connected to the first half shaft, and at this time the multi-mode torque vectoring electric drive axle is switched to a torque vectoring mode;

the dual-gear mechanism is configured to adjust magnitude and direction of a torque transmitted thereon and then transfer the torque to the differential; the dual-gear mechanism comprises a second gear ring, a first gear, a dual gear, and a dual-gear shaft; the second gear ring is fixedly connected to the first gear ring; the first gear is fixedly connected to a side of the differential housing; the dual gear comprises a second gear and a third gear; wherein the third gear is bigger than the second gear; the second gear is in internal engagement with the second gear ring for transmission, and the third gear is in external engagement with the first gear for transmission; the dual-gear shaft is configured to rotatably support the dual gear, and is fixedly provided on the main housing;

in order to ensure that when the multi-mode torque vectoring electric drive axle is switched to the torque vectoring mode, a torque increase of the first half shaft is equal to a torque decrease of the second half shaft or a torque decrease of the first half shaft is equal to a torque increase of the second half shaft, the number of teeth on each gear in the dual-gear mechanism is required to meet the following condition:

$$\frac{Z_2 Z_4}{Z_1 Z_3} = \frac{1}{k_3};$$

wherein $Z_1$ is the number of teeth on the second gear ring; $Z_2$ is the number of teeth on the second gear; $Z_3$ is the number of teeth on the third gear; $Z_4$ is the number of teeth on the first gear; and $k_3$ is a planetary-row characteristic parameter of the planetary gear set.

* * * * *